US010853575B2

(12) United States Patent
Kadav et al.

(10) Patent No.: US 10,853,575 B2
(45) Date of Patent: Dec. 1, 2020

(54) SYSTEM AND METHOD FOR FASTER INTERFACES ON TEXT-BASED TASKS USING ADAPTIVE MEMORY NETWORKS

(71) Applicant: NEC Laboratories America, Inc., Princeton, NJ (US)

(72) Inventors: Asim Kadav, Jersey City, NJ (US); Daniel Li, Irvine, CA (US)

(73) Assignee: NEC CORPORATION

( * ) Notice: Subject to any disclaimer, the term of this patent is extended or adjusted under 35 U.S.C. 154(b) by 141 days.

(21) Appl. No.: 16/170,314

(22) Filed: Oct. 25, 2018

(65) Prior Publication Data

US 2019/0129934 A1 May 2, 2019

Related U.S. Application Data

(60) Provisional application No. 62/577,202, filed on Oct. 26, 2017.

(51) Int. Cl.
*G06F 40/30* (2020.01)
*G06F 40/295* (2020.01)
*G06F 9/50* (2006.01)
*G06F 3/06* (2006.01)
*G06F 9/48* (2006.01)
*G08G 5/00* (2006.01)
*G06N 3/02* (2006.01)

(52) U.S. Cl.
CPC .......... *G06F 40/295* (2020.01); *G06F 3/0604* (2013.01); *G06F 3/067* (2013.01); *G06F 3/0644* (2013.01); *G06F 9/4881* (2013.01); *G06F 9/5016* (2013.01); *G06N 3/02* (2013.01); *G08G 5/0043* (2013.01)

(58) Field of Classification Search
CPC ............................. G06F 40/295; G06F 40/30
See application file for complete search history.

(56) References Cited

U.S. PATENT DOCUMENTS

| | | | | |
|---|---|---|---|---|
| 2015/0254244 | A1* | 9/2015 | Chu-Carroll | G06F 16/3329 707/722 |
| 2015/0356203 | A1* | 12/2015 | Allen | G06F 16/2477 707/725 |
| 2016/0103884 | A1* | 4/2016 | Clifford | G06F 16/24522 707/724 |

OTHER PUBLICATIONS

Chandar, Sarath, et al. "Hierarchical memory networks." arXiv preprint arXiv:1605.07427 (2016). (Year: 2016).*

(Continued)

*Primary Examiner* — Jialong He
(74) *Attorney, Agent, or Firm* — Joseph Kolodka (57) ABSTRACT

A method for performing question answer (QA) tasks that includes entering an input into an encoder portion of an adaptive memory network, wherein the encoder portion parses the input into entities of text for arrangement of memory banks. A bank controller of the adaptive memory network organizes the entities into progressively weighted banks within the arrangement of memory banks. The arrangement of memory banks may be arranged to have an initial memory bank having lowest relevance for lowest relevance entities being closest to the encoder, and a final memory bank having a highest relevance for highest relevance entities being closes to a decoder. The method may continue with inferring an answer for the question answer (QA) task with the decoder analyzing only the highest relevance entities in the final memory bank.

19 Claims, 8 Drawing Sheets

(56) References Cited

OTHER PUBLICATIONS

Kumar, Ankit, et al. "Ask me anything: Dynamic memory networks for natural language processing." International conference on machine learning. 2016 (Year: 2016).*
Graves, Alex, Greg Wayne, and Ivo Danihelka. "Neural turing machines." arXiv preprint arXiv:1410.5401 (2014). (Year: 2014).*
Weston, J. et al., "Memory Networks" arXiv: 1410.3916v11 (Nov. 2015) pp. 1-15.
Liu, L. et al., "Dynamic Deep Neural Networks: Optimizing Accuracy-Efficiency Trade-offs by Selective Execution" arXiv:1701.00299v1 (Jan. 2017) pp. 1-12.
Tulving, E., "Episodic Memory: From Mind to Brain" Annu. Rev. Psychol. (Feb. 2002) pp. 1-29, vol. 53.
Henaff, M. et al., "Tracking the World State with Recurrent Entity Networks" arXiv: 1612.03969V3 (May 2017) pp. 1-15.
Xiong, C. et al., "Dynamic Memory Networks for Visual and Textual Question Answering" Proceedings of the 33rd International Conference on Machine Learning (Mar. 2016) pp. 1-10, vol. 48.
Rae, J. et al., "Scaling Memory-Augmented Neural Networks with Sparse Reads and Writes" arXiv:1610.09027v1 (Oct. 2016) pp. 1-17.
Johnson, D., "Learning Graphical State Transitions" ICLR 2017 (Oct. 2016) pp. 1-19.
Tulving, E., "Episodic and Semantic Memory" (Jun. 1972) Organization of Memory (New York, NY: Academic Press Inc.) pp. 381-403.

\* cited by examiner

SYSTEM AND METHOD FOR FASTER INTERFACES ON TEXT-BASED TASKS USING ADAPTIVE MEMORY NETWORKS

RELATED APPLICATION INFORMATION

This application claims priority to provisional application No. 62/577,202, filed on Oct. 26, 2017, incorporated herein by reference in its entirety.

BACKGROUND

Technical Field

The present invention relates to real world question and answer (QA) tasks, and more particularly to the use of memory networks being applied to question and answer (QA) tasks.

Description of the Related Art

Question Answering (QA) tasks are gaining significance due to their widespread applicability to recent commercial applications such as chatbots, voice assistants and even medical diagnosis. Furthermore, many existing natural language tasks can also be re-phrased as QA tasks. Providing faster inference times for QA tasks is advantageous. Consumer device based question-answer services have hard timeouts for answering questions. However, these service application programmer interfaces (APIs) are wrapped around hard-timeouts of 8 seconds which includes the time to transliterate the question to text on servers and the round-trip transfer time of question and the answer from the remote service, and sending the response back to the device. Furthermore, developers are encouraged to provide a list of questions ("utterances") apriori at each processing step to aid speech processing.

SUMMARY

In some embodiments, to provide faster inference for long sequence based inputs, Adaptive Memory Networks (AMN) are described herein that constructs a memory network on-the-fly based on the input. AMN constructs the memory nodes dynamically. However, in some embodiments, distinct from previous approaches, AMN constructs a memory architecture with network properties, such as number of memory banks are decided dynamically based on the input story.

According to an aspect of the present principles, a method is provided for performing question answer (QA) tasks. In one embodiment, the method may include entering an input into an encoder portion of an adaptive memory network, wherein the encoder portion parses the input into entities of text for arrangement of memory banks; and organizing the entities into progressively weighted banks within the arrangement of memory banks with a bank controller of the adaptive memory network. The arrangement of memory banks may be arranged to have an initial memory bank having lowest relevance for lowest relevance entities being closest to the encoder, and a final memory bank having a highest relevance for highest relevance entities being closes to a decoder. The method may continue with inferring an answer for the question answer (QA) task with the decoder analyzing only the highest relevance entities in the final memory bank, wherein by limiting the decoder analysis to only the highest relevance entities decreases inference time.

According to another aspect of the present principles, a system is provided for performing question answer (QA) tasks. In one embodiment, the system includes a bank controller including at least one processor coupled to a memory device for organizing entities into progressively weighted banks within an arrangement of memory banks of an adaptive memory network. The system may further include a decoder for inferring an answer for the question answer (QA) task using only highest relevance entities in the progressively weighted banks within the arrangement of memory banks of the adaptive memory network, wherein by limiting the decoder analysis to only the highest relevance entities decreases inference time.

According to another aspect of the present principles, a non-transitory computer readable medium is provided for performing question answer (QA) tasks. In one embodiment, the non-transitory computer readable medium may include instructions for a method of performing question answer (QA) tasks. In one embodiment, the method may include organizing entities into progressively weighted banks within an arrangement of memory banks with a bank controller of the adaptive memory network. The arrangement of memory banks may be arranged to have a final memory bank having a highest relevance for highest relevance entities that is closest to a decoder. The method may continue with inferring an answer for the question answer (QA) task with the decoder analyzing only the highest relevance entities in the final memory bank, wherein by limiting the decoder analysis to only the highest relevance entities decreases inference time.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for providing faster interference on text based tasks using adaptive memory networks (AMN).

Real-world QA tasks consist of millions of words that often represent many facts and entities. It has been determined that existing memory models based on long short term memory (LSTMs) require a large number of parameters to support an external memory and do not generalize well for long sequence inputs. Memory networks attempt to address these limitations, but examine all input facts or their intermediate representations. Hence, for longer sequence inputs, the intermediate memory components proportionally scale in size resulting in poor inference times and high computation costs.

In a particularly useful embodiment, the present principles, systems and methods provide Adaptive Memory Networks (AMN) to process input question pairs to dynamically construct a network architecture optimized for lower inference times. During inference, AMN parses input text into entities within different memory slots. However, distinct from previous work, AMN is a dynamic network architecture creating variable numbers of memory banks that are weighted by question relevance. Thus, the decoder can select a variable number of memory banks to construct an answer using fewer banks, creating a runtime trade-off between accuracy and speed. AMN is enabled by first, a novel bank controller that makes discrete decisions with high accuracy and second, the capabilities of dynamic framework (such as PyTorch) that allow for dynamic network sizing and efficient variable mini-batching. The systems, and methods provided herein, employs an AMN to construct varying numbers of memory banks based on the task complexity and achieves faster inference times for toy tasks, e.g., simple task, standard bAbi tasks, and modified bAbi tasks. The methods and structures achieve state of the art accuracy (SOTA) over these tasks with lower inference times.

The AMN network construction shares some characteristics with working memory representations. There is sufficient evidence for multiple, working memory representations in the human. Semantic memory represents a hierarchical organization starting with relevant facts at the lowest level and progressively more complex and distant concepts at higher levels. Similarly, AMN constructs entities from the input stories and stores the most relevant entities based on the question in the lowest level memory bank. Higher level memory banks represent distant concepts (and not necessarily higher level concepts for AMN).

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Figure 1:
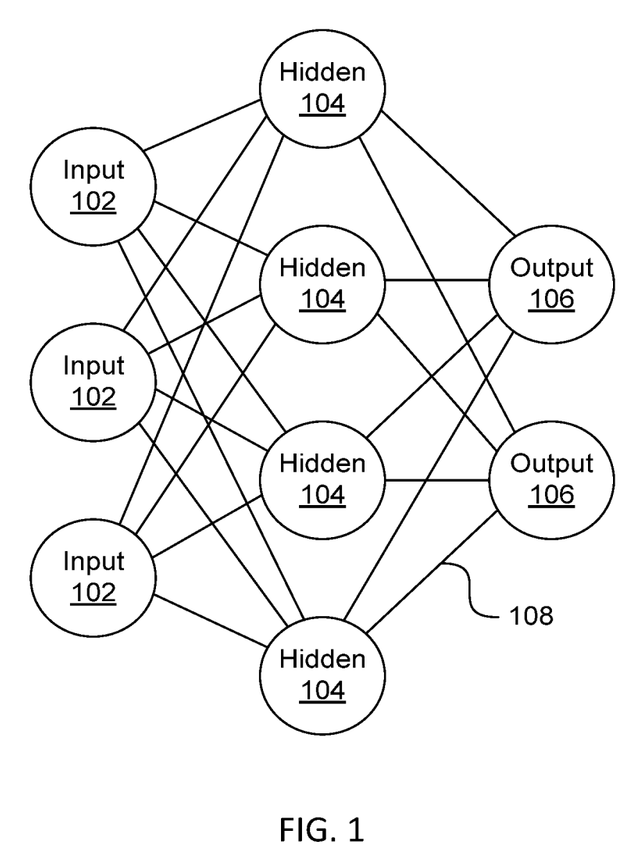
FIG. 1 is a generalized diagram of a neural network.

Referring now to FIG. 1, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There may be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

Figure 2:
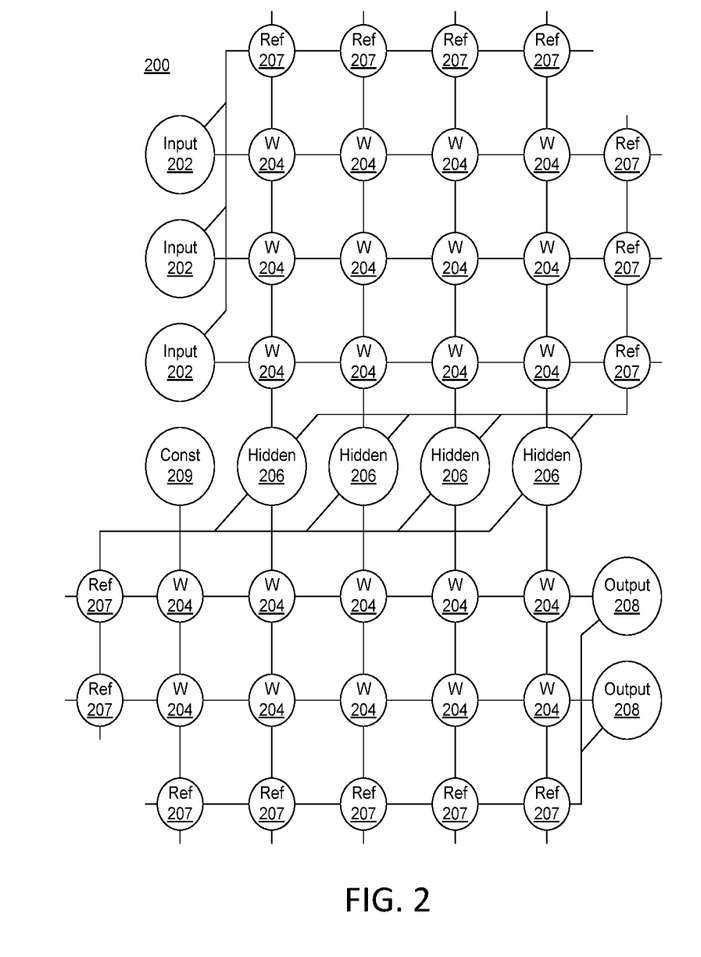
FIG. 2 is a generalized diagram of an artificial neural network (ANN) architecture.

FIG. 2, an artificial neural network (ANN) architecture 200 is shown. It should be understood that the present architecture is purely exemplary and that other architectures or types of neural network may be used instead. During feed-forward operation, a set of input neurons 202 each provide an input voltage in parallel to a respective row of weights 204. The weights 204 each have a settable resistance value, such that a current output flows from the weight 204 to a respective hidden neuron 206 to represent the weighted input. The current output by a given weight is determined as $$I = \frac{V}{r},$$

where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values.

As an alternative to using the reference weights 207, another embodiment may use separate arrays of weights 204 to capture negative values. Each approach has advantages and disadvantages. Using the reference weights 207 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 204 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 206 use the currents from the array of weights 204 and the reference weights 207 to perform some calculation. The hidden neurons 206 then output a voltage of their own to another array of weights 204. This array performs in the same way, with a column of weights 204 receiving a voltage from their respective hidden neuron 206 to produce a weighted current output that adds row-wise and is provided to the output neuron 208.

It should be understood that any number of these stages may be implemented, by interposing additional layers of arrays and hidden neurons 206. It should also be noted that some neurons may be constant neurons 209, which provide a constant voltage to the array. The constant neurons 209 can be present among the input neurons 202 and/or hidden neurons 206 and are only used during feed-forward operation.

During back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

During weight updates, the input neurons 202 and hidden neurons 206 apply a first weight update voltage forward and the output neurons 208 and hidden neurons 206 apply a second weight update voltage backward through the network 200. The combinations of these voltages create a state change within each weight 204, causing the weight 204 to take on a new resistance value. In this manner the weights 204 can be trained to adapt the neural network 200 to errors in its processing. It should be noted that the three modes of operation, feed forward, back propagation, and weight update, do not overlap with one another.

Figure 3:
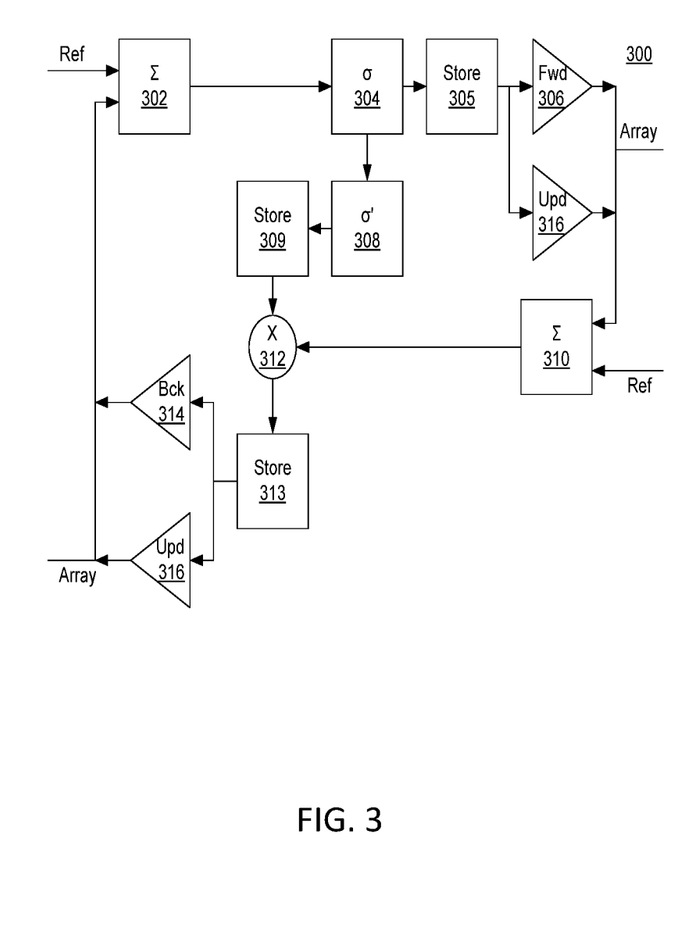
FIG. 3 is a block diagram of a neuron.

Referring now to FIG. 3, a block diagram of a neuron 300 is shown. This neuron may represent any of the input neurons 202, the hidden neurons 206, or the output neurons 208. It should be noted that FIG. 3 shows components to address all three phases of operation: feed forward, back propagation, and weight update. However, because the different phases do not overlap, there will necessarily be some form of control mechanism within in the neuron 300 to control which components are active. It should therefore be understood that there may be switches and other structures that are not shown in the neuron 300 to handle switching between modes.

In feed forward mode, a difference block 302 determines the value of the input from the array by comparing it to the reference input. This sets both a magnitude and a sign (e.g., + or −) of the input to the neuron 300 from the array. Block 304 performs a computation based on the input, the output of which is stored in storage 305. It is specifically contemplated that block 304 computes a non-linear function and may be implemented as analog or digital circuitry or may be performed in software. The value determined by the function block 304 is converted to a voltage at feed forward generator 306, which applies the voltage to the next array. The signal propagates this way by passing through multiple layers of arrays and neurons until it reaches the final output layer of neurons. The input is also applied to a derivative of the non-linear function in block 308, the output of which is stored in memory 309.

During back propagation mode, an error signal is generated. The error signal may be generated at an output neuron 208 or may be computed by a separate unit that accepts inputs from the output neurons 208 and compares the output to a correct output based on the training data. Otherwise, if the neuron 300 is a hidden neuron 206, it receives back propagating information from the array of weights 204 and compares the received information with the reference signal at difference block 310 to provide a continuously valued, signed error signal. This error signal is multiplied by the derivative of the non-linear function from the previous feed forward step stored in memory 309 using a multiplier 312, with the result being stored in the storage 313. The value determined by the multiplier 312 is converted to a backwards propagating voltage pulse proportional to the computed error at back propagation generator 314, which applies the voltage to the previous array. The error signal propagates in this way by passing through multiple layers of arrays and neurons until it reaches the input layer of neurons 202.

During weight update mode, after both forward and backward passes are completed, each weight 204 is updated proportional to the product of the signal passed through the weight during the forward and backward passes. The update signal generators 316 provide voltage pulses in both directions (though note that, for input and output neurons, only one direction will be available). The shapes and amplitudes of the pulses from update generators 316 are configured to change a state of the weights 204, such that the resistance of the weights 204 is updated.

In one particular embodiment, the weights 204 may be implemented in software or in hardware, for example using relatively complicated weighting circuitry or using resistive cross point devices. Such resistive devices may have switching characteristics that have a non-linearity that can be used for processing data. The weights 204 may belong to a class of device called a resistive processing unit (RPU), because their non-linear characteristics are used to perform calculations in the neural network 200. The RPU devices may be implemented with resistive random access memory (RRAM), phase change memory (PCM), programmable metallization cell (PMC) memory, or any other device that has non-linear resistive switching characteristics. Such RPU devices may also be considered as memristive systems.

In a particularly useful embodiment, to provide faster inference for long sequence based inputs, Adaptive Memory Networks (AMN) are presented herein that construct a memory network on-the-fly based on the input. In some embodiment, the AMN constructs the memory nodes dynamically. However, distinct from previous approaches, AMN constructs a memory architecture with network properties, such as number of memory banks are decided dynamically based on the input story. In one example, given a list of possible questions, the AMN of the present disclosure can store the entities from the input story in a number of memory banks. As the number of entities grow, the network learns to construct newer banks and move entities that are more relevant closer to the decoder into nearby memory banks. Hence, by limiting the decoding step to a dynamic number of lower level semantic memory banks, AMN can achieve lower inference times. In some embodiments, AMN is an end-to-end trained model with dynamic learned parameters for memory bank creation and movement of entities.

Figure 4:
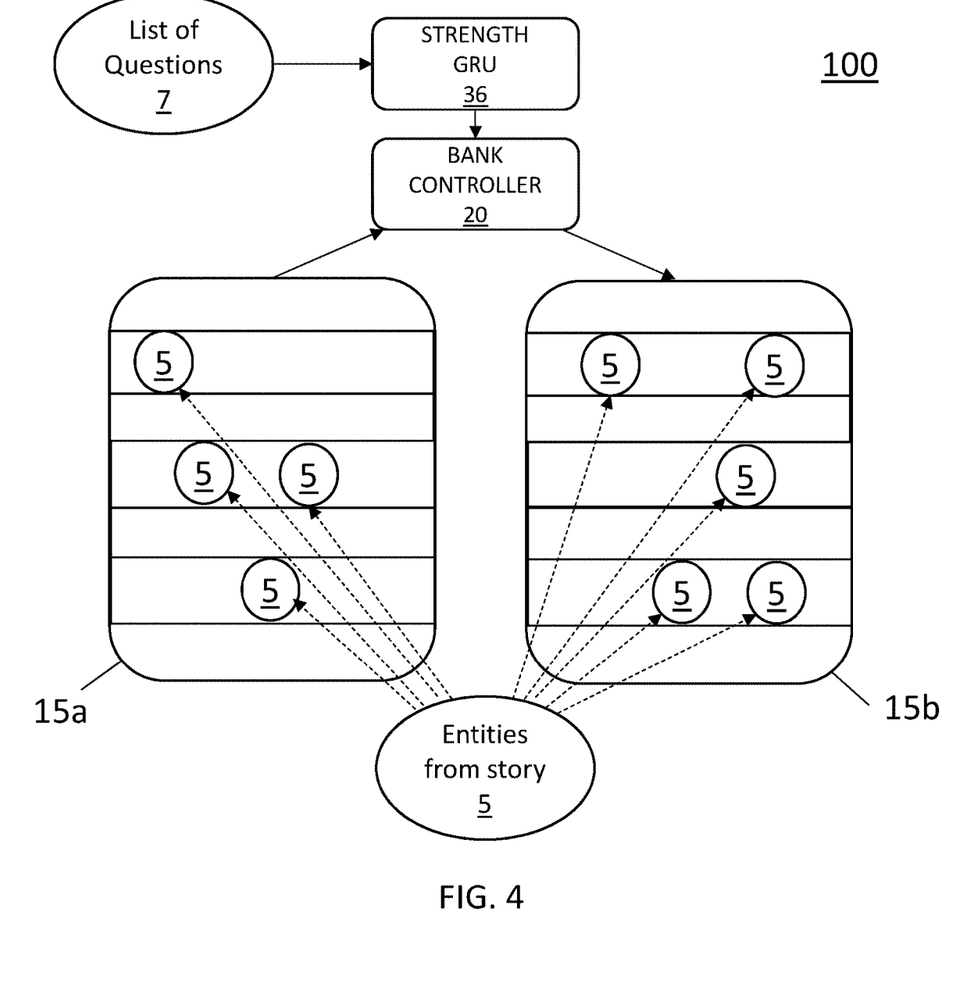
FIG. 4 is a block/flow diagram illustrating one example of an adaptive memory network (AMN), in accordance with the present principles.

FIG. 4 demonstrates one embodiment of the behavior of an AMN 100 during inference for a simple QA task that only constructs two memory banks 15a, 15b. During inference only the entities in the left bank 15a, e.g., a low inference time memory bank, are considered reducing inference times. To realize its goals, the AMN 100 introduces a bank controller 20 that uses reparameterization tricks to make discrete decisions with high accuracy while maintaining differentiability. A reparameterization trick allows the neural network to predict in making discrete decisions, like "Create a memory bank" as opposed to a continuous value while maintaining differentiability of the network (e.g., making sure that the neural network still works based on differentiation principles. In some embodiments, the AMN also reasons over the sentence structures. The entities are circles inside the banks and they have been initialized from reading the input story text.

Figure 5:
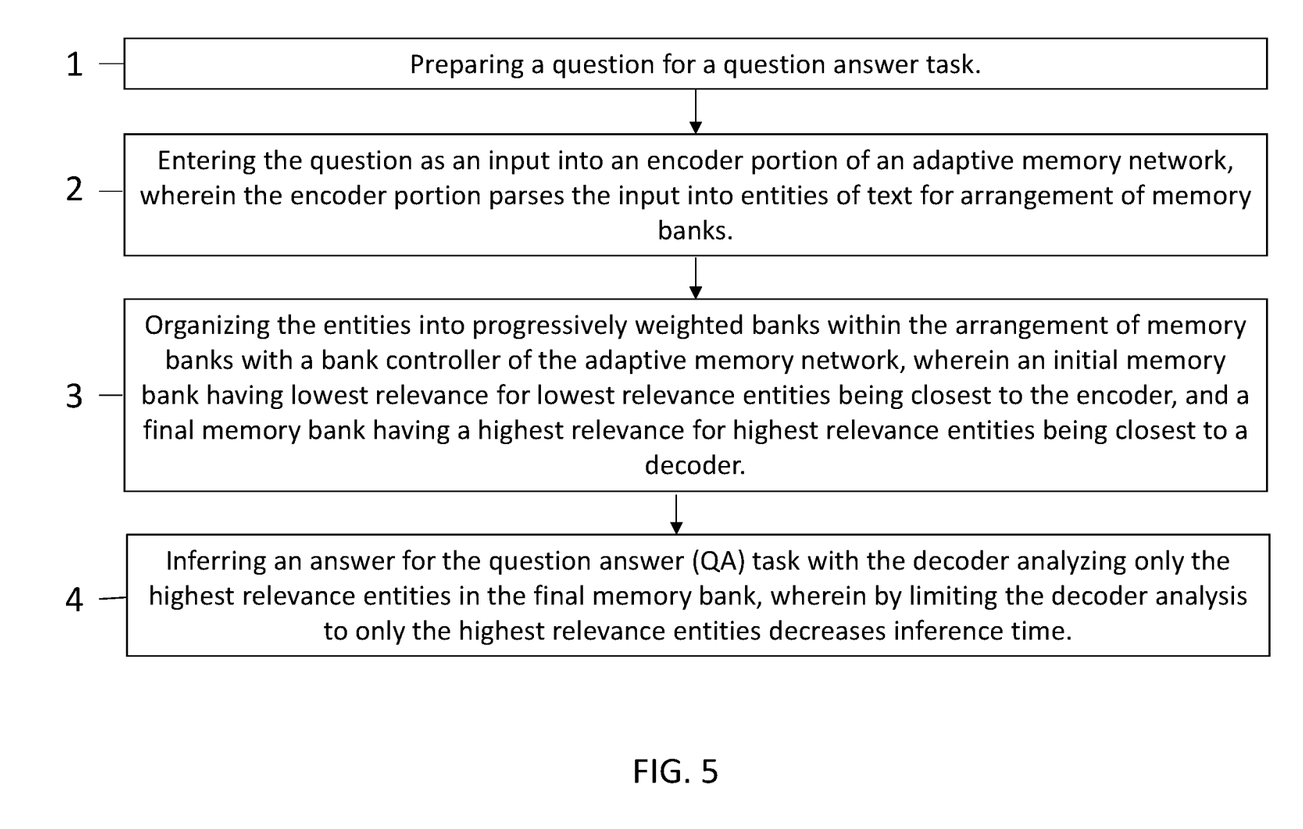
FIG. 5 is a block/flow diagram illustrating one embodiment of a process flow for performing a question answer task in accordance with the present disclosure.

Aspects of the present invention are described herein with reference to flowchart illustrations and/or block diagrams of methods, apparatus (systems), and computer program products according to embodiments of the invention. FIG. 5 illustrates one embodiment of a process flow for performing a question answer task in accordance with the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In some embodiments, at block 1 of the question answer (QA) task process flow depicted in FIG. 5, the method may begin with a user providing a question 7 for a question answer (QA) task. The question 7 may be based on an implementation of a forensic type. For example, the question 7 may be directed to financial information and/or a driver assistance application, such as traffic determinations and driver directions.

In some embodiments, once the question 7 is provided, the question 7 can be entered into an encoder 25 of the AMN 100, in which the encoder 25 parses the input into entities 5 at block 2 of the process flow depicted in FIG. 5.

Figure 6:
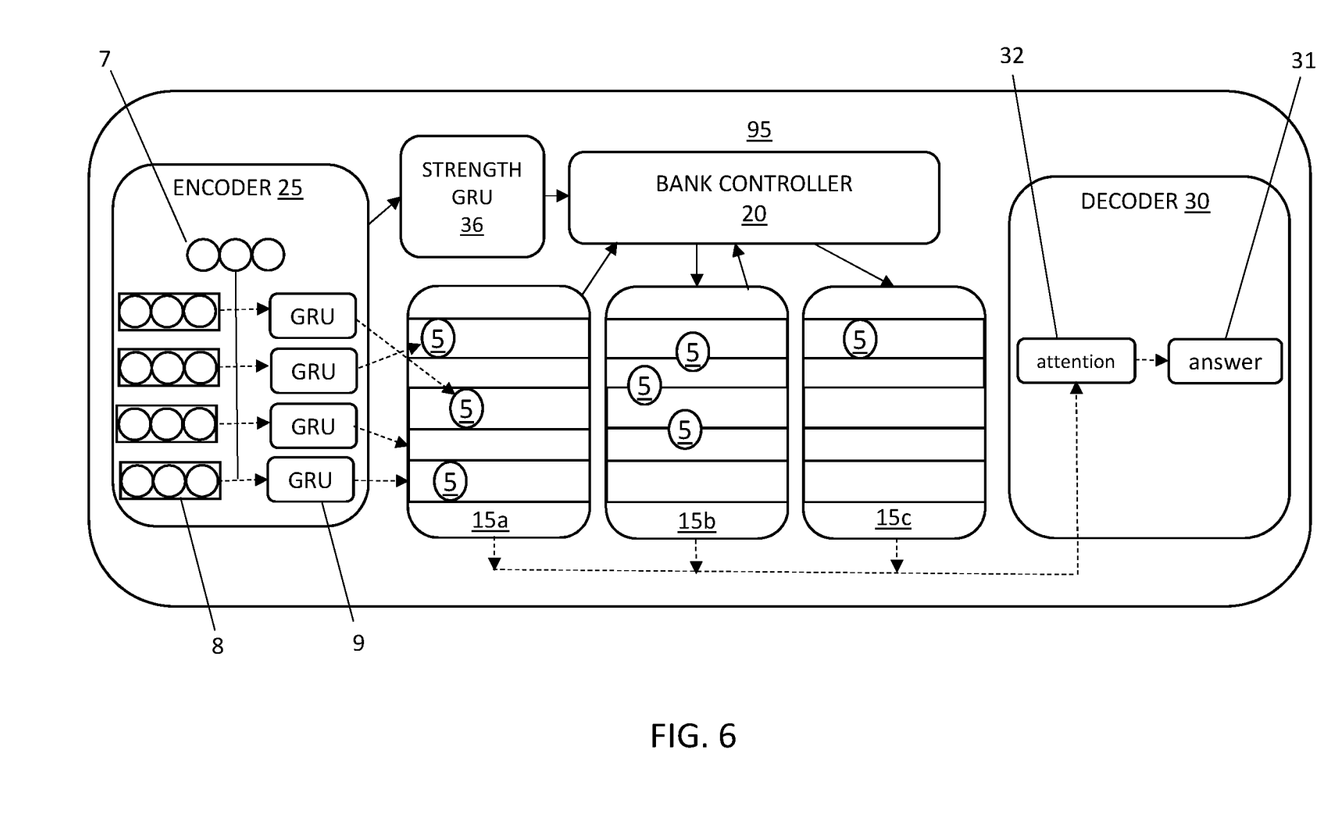
FIG. 6 is a block diagram of an adaptive memory network (AMN) depicting a plurality of memory banks, in accordance with the present principles.

Referring to FIG. 6, in some embodiments, in the AMN 100 of the present disclosure, entities 5 are gradually and recurrently processed to filter out irrelevant nodes so in the final inference stage, e.g., last memory bank 15c, so that there are fewer entities 5 to be considered by the decoder 30. As used herein, an "entity" is a portion, e.g., fact, that is taken from the story of the question answer (QA) task for consideration by the AMN in answering the question. Note that the word filter implies a discrete decision and that recurrence implies time. If the method and systems of the present disclosure were to perform a strict cut off and remove entities that appear to be irrelevant at each time step, reasoning that requires previous entities that were cut off and no longer considered would not be possible. Thus, smoothed discretization is required. The methods and systems employing the AMN 100 of the present disclosure design filtering to be a two stage pseudo continuous process to simulate discrete cut offs ($\Pi_{move}$, $\Pi_{new}$), while keeping reference history.

Referring to block 3 of FIG. 5, in some embodiments, the method may include organizing the entities 5 into progressively weighted banks 15a, 15b, 15c within the arrangement of memory banks with a bank controller 20 of the adaptive memory network 100, wherein an initial memory bank 15a having lowest relevance for lowest relevance entities being closest to the encoder 25, and a final memory bank 15c having a highest relevance for highest relevance entities being closest to a decoder 30.

Referring to FIG. 6, in some embodiments, the overall memory (M) consists of multiple memory banks 15a, 15b, 15c of entities ($m_{0 \ldots l}$), where $m_0$ denotes the initial and most general bank and $m_l$ denotes the most relevant bank. Note that |l| is input dependent and learned. First, entities are moved from the memory bank $m_0$ gradually towards the most relevant memory bank $m_l$ based off of the individual relevance to the question and second, if $m_l$ becomes too saturated, $m_l+1$ is created. Operations in the external memory allow for such dynamic restructuring and entity updates are described below. Note that these operations still maintain end to end differentiability. The entity updates may include:

1. Memory bank creation ($\Pi_{new}$), which creates a new memory bank depending on the current states of entities $m_i$. If the entropy of $m_i$ is too high, the AMN 100 including the memory bank $\Pi_{new}(m_i)$ will learn to create a new memory bank $m_t+1$ to reduce entropy.

2. Moving entities 5 across banks ($\Pi_{move}$), which determines which entities 5 are relevant move, to the current question and move such entities 5 to further (higher importance) memory banks.

3. Adding/Updating entities in a bank ($\Pi_{au}$), which adds entities that are not yet encountered to the first memory bank $m_0$ or if the entity is already in $m_0$, the operation updates the entity state 5.

4. Propagating changes across entities ($\Pi_{prop}$), which updates the entity states in memory banks based on node current states $\Pi_{prop}(M)$ and their semantic relationships. This is to communicate transitive logic.

Both memory bank creation $\Pi_{new}$ and moving entities across the memory banks $\Pi_{move}$ require a discrete decision, which is part of memory bank operation, and in particular, for memory bank creation $\Pi_{new}$ the AMN 100 introduces the notion of entropy. That is to say if the current states of entities $m_i$ contains too many nodes (the entropy becomes too high), the memory module will learn to create a new bank $m_t+1$ and move nodes to $m_t+1$ to reduce entropy. By creating more memory banks 15a, 15b, 15c, the model spreads out the concentration of information which in turn better discretizes nodes, e.g., nodes of entities 5, according to relevance.

FIG. 6 is a high level depiction of an adaptive memory network (AMN) 100. A mathematical detail of the modules of the AMN 100 is now provided, in which the AMN 100 model adopts the encoder-decoder framework 25, 30 with an augmented adaptive memory module. In one embodiment, the algorithm for the augmented adaptive memory module 95 of the adaptive memory network (AMN) 100 is as follows:

---

Algorithm 1 AMN(S, q, a)

---

1: M ← ∅
2: for sentence s ∈ S do
3:   for word w ∈ s do
4:     D ← ENCODE(w, q)
5:     $n_s$ ← SGRU(D)
6:   end for
7:   for memory bank $m_i$ ∈ M do
8:     $m_i$ ← $\Pi_{au}(m_i, D)$
9:     $m_i$ ← $\Pi_{prop}(m_i)$
10:     $m_{i+1}$ ← $\Pi_{move}(m_i, n_s)$
11:     $n_{mi}$ ← SGRU(D, $n_{mi}$)
12:     if i = |M| and $\Pi_{new}(m_i)$ then
13:       M, p ← [M, $m_{i+1}$]
14:       Repeat 8 to 11 once
15:     end if
16:   end for
17:   bprop $\mathcal{L}_s(p), \mathcal{L}_b(n)$
18: end for
19: â ← DECODE(M, q)
20: bprop $\mathcal{L}_p(â, a)$

---

In algorithm 1, M is the total memory, and in line 1 is set at an initial ∅ memory state, such as empty. In lines 2: and 3, the lower case s denotes a single sentence, while an upper case S denotes all sentences in an inquiry. In line 4: D denotes stored accumulation of the GRU output. In lines 17-20: $\mathcal{L}_p$ is answer loss, $\mathcal{L}_s$ is sensor loss, and $\mathcal{L}_b$ is band loss. The remainder of the symbols in algorithm 1 are described throughout the present disclosure.

For example, in one embodiment, a story represented by N input sentences (or statements), e.g., $(l_1, \ldots, l_N)$, and a question q of a question answer (QA) task, the goal of the system including the AMN 100 is to generate an answer a. Each sentence l is a sequence of N words, denoted as $(w_1, \ldots, w_N)$, and a question is a sequence $N_q$ words denoted as $(w_1, \ldots, w_{Nq})$. In some embodiments, entities can be interpreted as a 3-tuple of $e_w$=(word ID wi, hidden state w, question relevance strength s). As used herein, scalars, vectors, matrices, and dot products are denoted by lower-case letters, boldface lower-case letters and boldface capital letters, and angled brackets, respectively.

The story 8 of the QA task is first analyzed by the encoder 25. The input to the AMN 100 can start with the encoder 25. In one example, the input to the model, starting with the encoder 25, can be story-question input pairs. On a macro level, sentences $l_{1 \ldots N}$ are processed. On a micro level, words $w_{l \ldots N}$ are processed within sentences. For each $wi \in li$, the encoder maps $w_i$ to a hidden representation and a question relevance score ∈[0,1]. The word ID of $w_i$ is passed through a standard embedding layer and then encoded through an accumulation gated recurrent unit (GRU) 9. In some embodiments, the accumulation GRU 9 captures entity states through time by adding the output of each GRU time step to its respective word, which is stored in a lookup matrix. The initial states of $e_w$ are set to this GRU output. Meanwhile, the question is also embedded and encoded in the same manner sans accumulation. In the following, the subscripts i, j are used to iterate through the total number of words in a statement and question respectively, D stores the accumulation GRU output, and $w_i$ is a GRU encoding output. The last output of the GRU will be referred to as $w_N$, $w_{Nq}$ for statements and questions.

$$u_i, u_j = EMBED(wi_i, wi_j) \quad (1)$$

$$w_N^{t+1} = GRU(u_i, w_i^t) \quad (2)$$

$$D[i] += w_i^{t+1} \quad (3)$$

$$w_{Nq}^{t+1} = GRU(u_j, w_j) \quad (4)$$

Referring to equations (1) through (4), $u_i$, $u_j$ is the out from word embedding.

In some embodiments, the AMN model 100 uses the GRU-like equations, e.g., equations (1)-(4) to compute the question relevance strength s∈[0,1] for each word, the model uses GRU-like equations. The node strengths are first initialized to Xavier (X) normal and the inputs are the current word states $w^{in}$, the question state $w_{Nq}$, and when applicable, the previous strength.

$$z^t = \sigma(U_z w^{in} + W_z w_{Nq} + X_z s^{t-1}) \quad (5)$$

$$r^t = 1 - \sigma(U_r \langle s^{t-1}, w_{Nq} \rangle) \quad (6)$$

$$\tilde{s}^t = \sigma(W_h w^c + U_h(r^t \odot s^{t-1})) \quad (7)$$

$$s^t = z^t \odot s^{t-1} + (1-z^t) \odot \tilde{s} \quad (8)$$

In equations (5)-(8), z an r designate gates of the GRU. The symbol ⊙ is the function cross product. The variable r and q are polymorphic functions. The remainder of the symbols in equations (5) through (8) are described throughout the present disclosure.

In particular, equation (6) shows where the model learns to lower the strengths of nodes that are not related the question by taking a dissimilarity measure. These operations as SGRU (Strength GRU) in Algorithm 1.

Still referring to FIG. 6, the adaptive memory module 95 recurrently restructures entities in a question relevant manner so the decoder 30 can then consider fewer entities (namely, the question relevant entities) to generate an answer. The following operations are performed once per sentence.

Still referring to FIG. 6, the AMN 100 includes a memory bank controller 20. As noted above, discrete decisions are difficult for neural networks to learn. The AMN 100 of the present disclosure employs a specific memory bank controller $\Pi_{ctrl}$ 20 for binary decision making. In some embodiments, the model takes ideas from a reparameterization trick and uses custom back-propagation to maintain differentiability. In some embodiments, the adaptive memory module 95 makes two discrete decisions on a $\{0,1\}$ basis. For example, the adaptive memory module 95 can make one decision in $\Pi_{new}$ to create a new memory bank, and the adaptive memory module 95 may make a second decision in $\Pi_{move}$ to move nodes to a different memory bank. The model uses a scalar $p \in \{0,1\}$, e.g., from equation (9), to parameterize a Bernoulli distribution where the realization H, e.g., from equation (10), is the decision the model makes. However, back propagation through a random node is intractable, so the model detaches H from the computation graph and introduces H as a new node. Meanwhile, p is kept in the computation graph and has a special computed loss.

$$p=(\log(q(\text{Softmax}(*))+\in)) \quad (9)$$

$$H=\text{Bernoulli}(e^p) \quad (10)$$

In equations (9) and (10), q is a polymorphic function, and $\in$ is a constant. The remainder of the symbols in equations (9) and (10) are described throughout the present disclosure.

Referring to FIG. 5, the memory bank controller 20 controls the ALM 100 through memory bank operations, such as memory bank creation, moving entities through the memory banks, adding/updating entities within a memory bank, and propagating updates to related entities.

In one embodiment, the memory bank operation of memory bank creation $\Pi_{new}$ includes determining when a new memory bank 15a, 15b, 15c is to be created. In other words, if the current memory bank becomes too saturated, the current memory bank $m_i$'s entity states are concatenated together ($\in R^{n|ew|}$) and passed into the bank controller (see equations 9,10). In this instance, q is a fully connected layer. Note this is only performed for the last memory bank.

$$\Pi_{new}([w_0 \ldots w_i]) = \begin{cases} M.\text{new}() & \text{if } \mathbb{1} \ (\Pi_{ctrl}([w_0 \ldots w_i])) \text{ else} \\ \text{pass} \end{cases} \quad (11)$$

The memory bank operation for moving entities 5 through memory banks $\Pi_{move}$ can be similar to the memory bank operation for creating new memory banks $\Pi_{new}$. For examples, the memory bank operation for moving entities 5 through memory banks 15a, 15b, 15c can include providing individual entities' relevance scores that are passed into the bank controller 20 to determine H. Here, q has a slight modification and is the identity function. Note that this operation can only be performed if there is a memory bank 15a, 15b, 15c to move nodes to, namely if $m_i+1$ exists. One algorithm for moving entities 5 through memory banks $\forall_{move}$ is equation (12), as follows:

$$\Pi_{move}(s_i*w_i)=m.\text{move}(\mathbb{1}(\Pi_{ctrl}(s_i*w_i))) \forall i \in m \quad (12)$$

In one embodiment, adding/updating entities 5 in a memory bank 15a, 15b, 15c includes recalling that entities 5 are initially set to the output of D. However, as additional sentences are processed, new entities 5 and their hidden states are observed. In the case of a new entity $e_w$, the entity 5 is added to the first memory bank $m_0$. If the entity already exists in $m_0$, then $e_w$'s corresponding hidden state is updated through a GRU 9. In some embodiments, this procedure is done for all memory banks 15a, 15b, 15c. One algorithm for adding/updating entities in a memory bank is equation (13), as follows:

$$\Pi_{new}([w_0 \ldots w_i]) = \begin{cases} m_0.\text{add}(e_w^i) & \text{if } e_w^i \notin m_0 \text{ else} \\ w_i^{t+1} = GRU(w_N, w_i^t) & \forall m \in M \end{cases} \quad (13)$$

In one embodiment, the memory bank controller 35 propagates updates to related entities. Entities can exist as a bag of words model and the sentence structure is not maintained. To track this information, the AMN 100 can model semantic relationships as a directed graph stored in adjacency matrix A. As sentences are processed word by word, a directed graph is drawn progressively from $w_0 \ldots w_i \ldots w_N$. If sentence $l_k$'s path contains nodes already in the current directed graph, $l_k$ will include said nodes in the its path. After $l_k$ is added to A, the model propagates the new update hidden state information a among all node states using a GRU. In one example, $a_i$ for each node i is equal to the sum of the incoming edges' node hidden states. Additionally, we add a particular emphasis on $l_k$ to simulate recency. At face value, one propagation step of A will only have a reachability of its immediate neighbor, so to reach all nodes, A is raised to a consecutive power r to reach and update each intermediate node. In one embodiment, r can be either the longest path in A or a set parameter. Again, this is done for all memory banks. A single iteration is shown below:

$$a=(A^r)^T[w_0 \ldots w_i] \quad (14)$$

$$w^{t+1}=GRU(a,w^t) \quad (15)$$

Referring to equation (14), a is a scalar output. When nodes are transferred across banks, A is still preserved. If intermediate nodes are removed from a path, a transitive closure is drawn if possible. After these steps are finished, all entities are passed through the strength modified GRU 36 to recompute question relevance.

Referring to FIG. 6, the method may continue with the decode, e.g., decoder 30, portion of the AMN 100. In some embodiments, the method of performing the question answer (QA) task depicted in FIG. 5 may continue with inferring an answer 31 for the question answer (QA) task with the decoder 30 analyzing only the highest relevance entities 5 in the final memory bank 15a, at step 4. In some embodiments, by limiting the decoder 30 analysis to only the highest relevance entities 5 decreases inference time. In one embodiments, the AMN 100 includes a learning step, e.g., machine learning step, illustrated by the block indicated as attention having reference number 32. In this example, the AMN 100 system learns from a plurality of question answer tasks the importance of some entity types.

Referring to FIG. 6, in one embodiment, after all sentences $l_1 \ldots N$ are ingested, the decoder 30 portion of the network learns to interpret the results from the memory banks 15a, 15b, 15c. This provides the answer to the question, which may be referred to as an inference. This can employ artificial intelligence and/or machine learning. In some embodiments, the network iterates through the memory banks 15a, 15b, 15c using a standard attention mechanism. To force the network to understand the question importance weighting, the model uses an exponential function d to weight important memory banks higher. $C_m$ are the hidden states contained in memory m, $w_{N_q}$ is the question hidden state, ps is the attention score, r,h are learned weight masks, g are the accumulated states, and l is the final logits prediction. During inference, fewer memory banks are considered.

$$C=[w_0, \ldots, w_i] \forall i \in m \tag{16}$$

$$ps=\text{Softmax}(\langle C, w_{N_q} \rangle) \tag{17}$$

$$g\mathrel{+}=d(\Sigma_{i \in m} \langle C, ps \rangle) \tag{18}$$

$$\hat{L}=r(PReLU(h(g)+w_{N_q}) \text{ if } m \text{ is last} \tag{19}$$

In equations (16)-(19), C is the hidden states, and $\hat{L}$ is a vector of a final L.

Loss is another aspect of the methods and systems of the present disclosure. In some examples, loss is comprised of two parts, answer loss, which is computed from the given annotations, and secondary loss (from $\Pi_{new}$, $\Pi_{move}$), which is computed from sentence and story features at each sentence time step $l_0 \ldots N$. Answer loss ($\mathcal{L}_p$) is standard cross entropy at the end of the story after $l_N$ is processed.

$$\mathcal{L}_p(\hat{L})=\text{CrossEntropy}(\hat{L}, L)$$

After each sentence, the node relevance s is enforced by computing the expected relevance E[s]. E[s] is determined by nodes that are connected to the answer node a in a directed graph; words that are connected to a are relevant to a. They are then weighted with a deterministic function of distance from a. Answer loss ($\mathcal{L}_s$) is as follows:

$$\mathcal{L}_s(s)=D_{KL}(s\|\mathbb{E}[s])$$

$D_{KL}$ is KL divergence, which is an operation to measure the difference between two distributions. Additionally, bank creation is kept in check by constraining p w.r.t. the expected number of memory banks. When modelling the expected number of memory banks through a geometric distribution-~Geometric(pg), where pg is a hyperparameter, typically directly proportional to story length. Bank loss (Lb) is as follows:

$$\mathcal{L}_b(p)=D_{KL}(p\|p_g)$$

In some examples, with all loss components combined, the final loss is given in the following equation loss ($\mathcal{L}_{total}$):

$$\mathcal{L}_{total} = \mathcal{L}_p(\hat{L}) + \sum_{i=0}^{|l_n|} (\mathcal{L}_s^i(s) + \mathcal{L}_b^i(p))$$

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
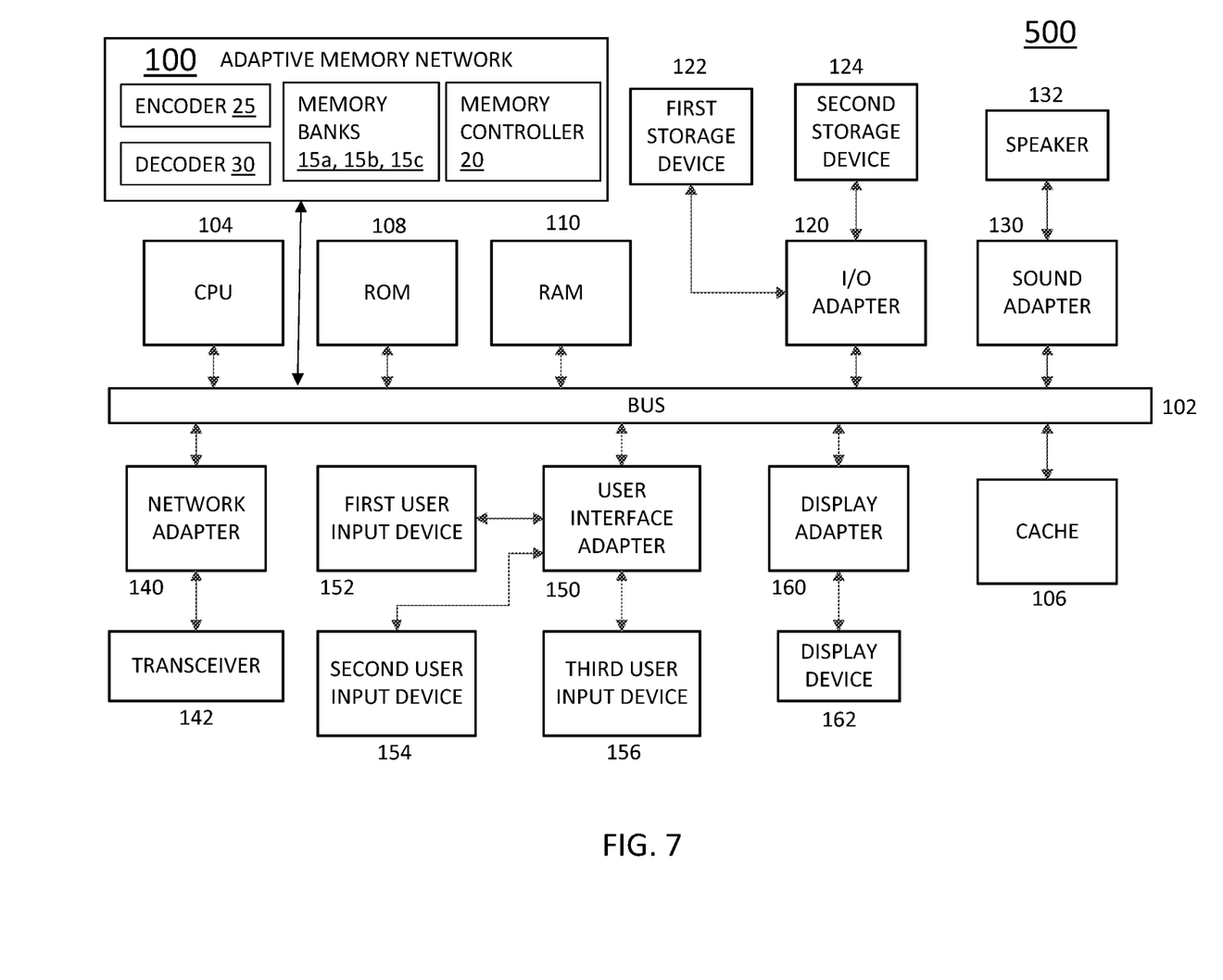
FIG. 7 is a block/flow diagram illustrating a system for providing tunable asynchronous approximate data-parallel processing for large scale data applications using stochastic reduction, in accordance with the present principles.

Referring now to FIG. 7, in which like numerals represent the same or similar elements that were previously described initially to FIGS. 4 and 6, an exemplary processing system 100, to which the present principles may be applied, is illustratively depicted in accordance with an embodiment of the present principles. The processing system 500 includes at least one processor (CPU) 104 operatively coupled to other components via a system bus 102, such as the AMN 100, to provide for the execution of question answer (QA) tasks, as described with refence to FIGS. 4, 5 and 6.

As depicted in FIG. 7, the AMN 100 includes an encoder 25, decoder 30, bank controller 20 and memory banks 15a, 15b, 15c. The function of each of these elements have been described above with reference to the descriptions employing the same reference numbers for elements depicted and/or discussed in FIGS. 4-6. Each of the blocks depicted in the AMN 100, encoder 25, decoder 30, bank controller 20 and memory banks 15a, 15b, 15c, may be provided by a physical memory device storing instructions specific to the functionality of the element, e.g., encoder 25, decoder 30, bank controller 20 and memory banks 15a, 15b, 15c. The physical memory device for each of the elements, e.g., encoder 25, decoder 30, bank controller 20 and memory banks 15a, 15b, 15c, may be employed in communication with a specific hardware processor to effectuate the function provided by the instructions of the memory for the element, e.g., encoder 25, decoder 30, bank controller 20 and memory banks 15a, 15b, 15c. It is noted that any element or structure depicted in FIGS. 4 and 6 may also be incorporated into the AMN 100 that is depicted in FIG. 7. The AMN 100 is connected to the system bus 102.

Referring to FIG. 7, a cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

In one embodiment, a method of performing question answer (QA) tasks is provided that includes entering an input into an encoder portion of an adaptive memory network, wherein the encoder portion parses the input into entities of text for arrangement of memory banks. In this example, the entities are directed to scheduling data. The method may continue with organizing the entities into progressively weighted banks within the arrangement of memory banks with a bank controller of the adaptive memory network. The highest relevance entities directed to scheduling data being in the final memory bank, while the lowest relevance entities directed to scheduling data being in the initial memory bank. The initial memory bank having lowest relevance for lowest relevance entities being closest to the encoder, and a final memory bank having a highest relevance for highest relevance entities being closes to a decoder. The method may further include inferring an answer for the question answer (QA) task with the decoder analyzing only the highest relevance entities in the final memory bank, wherein by limiting the decoder analysis to only the highest relevance entities decreases inference time. The answer to the question answer task provided by the decoder being a schedule based upon the highest relevance entities directed to scheduling data.

Figure 8:
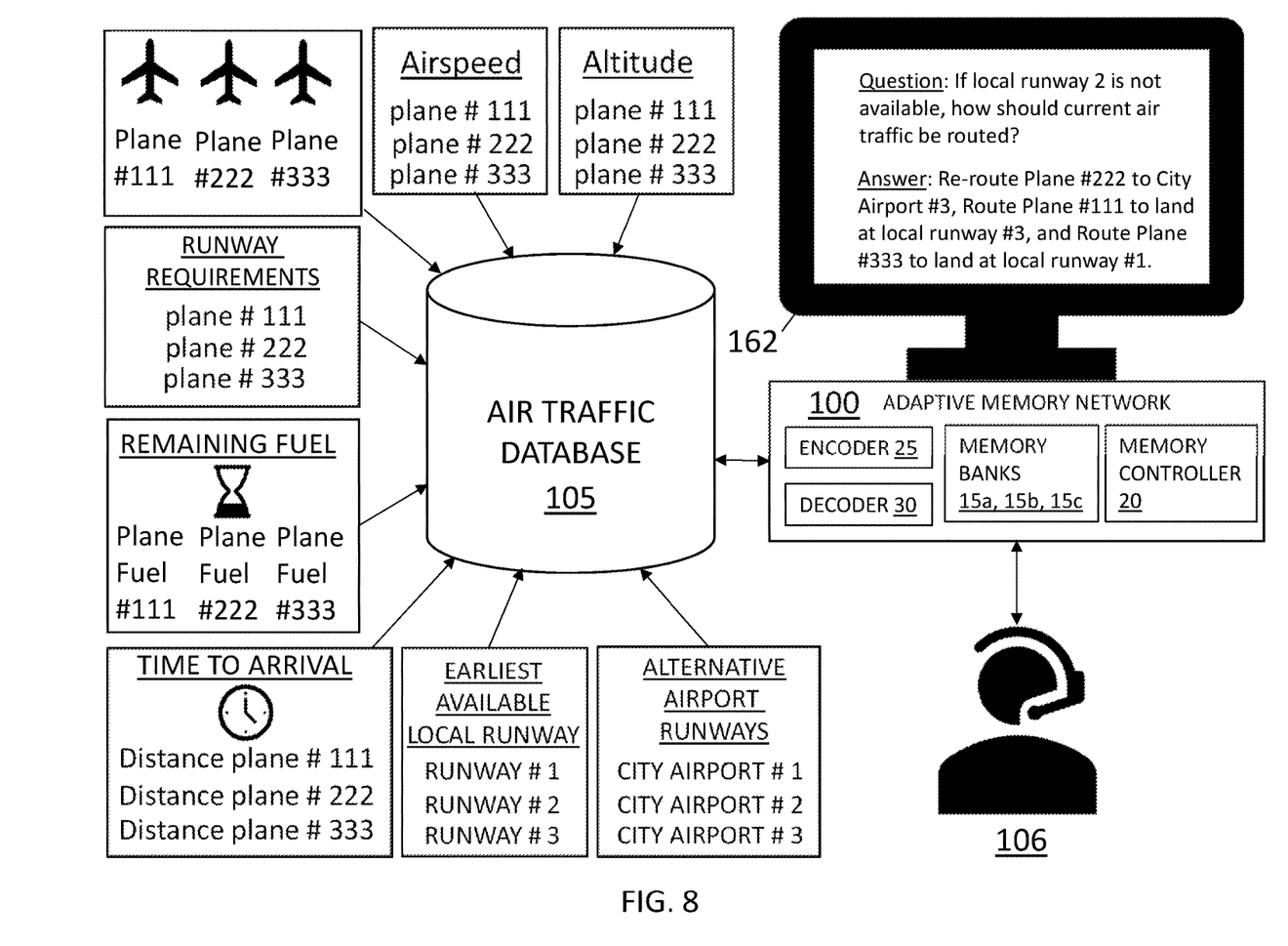
FIG. 8 is a block diagram of an adaptive memory network (AMN) depicting a plurality of memory banks in an implementation for air traffic control, in accordance with the present principles.

In some embodiments, the aforementioned scheduling method can be applied to an air traffic control application. FIG. 8 is a block diagram of an adaptive memory network (AMN) 100 including a plurality of memory banks 15a, 15b, 15c that are ordered for storing of entities of information having varying relevance to increase the inference stage of question answer (QA) tasks in an implementation for air traffic control. By providing the memory banks of varying relevance, the AMN 100 system provides a reduced number of highly relevant entities of information directed to air traffic control data for consideration by the decoder in providing air traffic control answers in faster time than previously possible. The answers provided by the AMN 100 system can provide schedules for aircraft traffic control including scheduling orders of landings of aircraft at local airports and rerouting of aircraft to neighboring air ports based on the air traffic control data.

According to another aspect of the present principles, a system is provided for performing question answer (QA) tasks. The system includes an AMN 100 system and an air traffic database 105. The air traffic database 105 is database of information on air traffic for a local airport, and includes air traffic information for surrounding airports. The air traffic database 105 can include information on the number of planes looking to land and/or take off from a local airport. For example, the data included in the air traffic database 105 can include aircraft identification for the aircraft in the system, runway requirements for the aircraft, fuel requirements for the aircraft, arrival time for the aircraft relating to landing sites, the earliest available runways at a local landing side, alternative airport runways in adjacent cities for rerouting, airplane airspeed, airplane altitude and other like criteria. The air traffic database 105 may be in communication with the system including the AMN 100 for performing question answer (QA) tasks relevant to air traffic control.

In one embodiment, the system includes an encoder 25 for receiving an input question of the question answer (QA) task, wherein the encoder 25 parses the input into entities for arrangement of memory banks in an adaptive memory network. The system may further include a bank controller 20 including at least one processor coupled to a memory device for organizing the entities into progressively weighted banks within the arrangement of memory banks 15a, 15b, 10c of the adaptive memory network. The system may further include a decoder 30 for inferring an answer for the question answer (QA) task using only highest relevance entities in the progressively weighted banks 15a, 15b, 15c within the arrangement of memory banks 15a, 15b, 15c of the adaptive memory network, wherein by limiting the decoder 30 analysis to only the highest relevance entities decreases inference time. The decoder 30 employing the entities from the questions and the data from the air traffic database 105 can employ machine learning to provide air traffic schedules and solve scheduling of air traffic events. Due to the reduced number of entities, which are scored as being relevant, and stored in a memory bank containing only the highest relevance entities, air traffic schedules and solving scheduling of air traffic events can be provided quicker than previously possible due to the decreased time of the inference stage of the analysis by the AMN 100.

In one embodiment, the AMN 100 employing a database of air traffic control information 105 is used in a method of air traffic control method that provides question answer (QA) tasks to air traffic control dispatchers, e.g., air traffic controllers 106. In one embodiment, the method may include entering an input into an encoder 25 of the adaptive memory network 100. The input is a question from the air traffic controller 106 regarding performance of his air traffic control duties. For example, the air traffic controller 106 may want assistance when the number of runways available for landings has changed. For example, the question may be "If runway #2 is not available, how should current air traffic be routed", as depicted on the display 162 of the adaptive memory network 100 system that is depicted in FIG. 8.

In some embodiments, the encoder 25 parses the input into entities of text for arrangement of memory banks 15a, 15b, 15c. The entities are organized into progressively weighted banks 15a, 15b, 15c within the arrangement of memory banks with a bank controller 20 of the adaptive memory network 100. The arrangement of memory banks may be arranged to have an initial memory bank having lowest relevance for lowest relevance entities being closest to the encoder, and a final memory bank having a highest relevance for highest relevance entities being closes to a decoder.

The method may continue with inferring an answer for the question answer (QA) task with the decoder 30 analyzing only the highest relevance entities in the final memory bank, wherein by limiting the decoder analysis to only the highest relevance entities decreases inference time. The decoder may employ machine learning and artificial intelligence in matching the most relevant entities from the weighted memory banks 15a, 15b, 15c to relevant data from the air traffic database 105 in providing the answer. For example, the answer may be "Re-route plane #222 to City Airport #3, Route plane $111 to land at local runway #3, and Route plane #333 to land at local runway #1". It is noted that this is only one example of a question answer (QA) task as implemented in an air traffic control application.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method of performing question answer (QA) tasks comprising:
   entering an input into an encoder portion of an adaptive memory network, wherein the encoder portion parses the input into entities of text for arrangement of memory banks;
   organizing the entities into progressively weighted banks within the arrangement of memory banks with a bank controller of the adaptive memory network, wherein an initial memory bank having lowest relevance for lowest relevance entities being closest by logical relationship to the encoder, and a final memory bank having a highest relevance for highest relevance entities being closest by logical relationship to a decoder; and
   inferring an answer for the question answer (QA) task with the decoder analyzing only the highest relevance entities in the final memory bank, wherein by limiting the decoder analysis to only the highest relevance entities decreases inference time.

2. The method of claim 1, wherein the encoder creates entities from words processed from a story and sentences processed from the story.

3. The method of claim 1, wherein the encoder creates entities directed to scheduling data, the highest relevance entities directed to scheduling data being in the final memory bank, the decoder providing a schedule based upon the highest relevance entities directed to scheduling data.

4. The method of claim 1, wherein said gradually increasing relevance banks extend from the initial memory bank to the final memory bank, the gradually increasing relevance banks having gradually increasing relevant entities.

5. The method of claim 1, wherein the memory bank controller organizes the entities using at least one memory bank function selected from the group consisting of memory bank creation, moving entities across memory banks, adding entities to a memory bank, propagating changes across entities, and combinations thereof.

6. The method of claim 5, wherein the memory bank controller organizes the entities with said memory bank creation, wherein new memory banks for the entities is formed by the bank controller when the entities entropy exceeds a maximum preset entropy.

7. The method of claim 6, wherein by creating said new memory banks, the adaptive memory network spreads out a concentration of information, which in turn increases the discretizes nodes according to relevance.

8. The method of claim 5, wherein the memory bank controller organizes the entities with said moving entities across said banks, wherein entities relevant to question are moved from memory banks having a low relevance to memory banks having a higher relevancy.

9. A system for performing question answer (QA) tasks comprising:
   a bank controller using a processor device operatively coupled to a memory for organizing entities from a question answer (QA) task into progressively weighted banks within an arrangement of memory banks of an adaptive memory network; and
   a decoder that infers an answer for the question answer (QA) task using only highest relevance entities in the progressively weighted banks within the arrangement of memory banks of the adaptive memory network, wherein by limiting the decoder analysis to only the highest relevance entities decreases inference time, wherein the bank controller organizes the entities into progressively weighted banks within the arrangement of memory banks with the bank controller of the adaptive memory network, wherein a final memory bank having a highest relevance for highest relevance entities being closest by logical relationship to the decoder.

10. The system of claim 9, wherein the memory bank controller organizes the entities with said moving entities across said banks, wherein entities relevant to question are moved from memory banks having a low relevance to memory banks having a higher relevancy.

11. The system of claim 9, wherein the entities directed to scheduling data, the highest relevance entities directed to scheduling data being in the final memory bank, the decoder that provides a schedule based upon the highest relevance entities directed to scheduling data.

12. The system of claim 9, wherein the memory bank controller organizes the entities using at least one memory bank function selected from the group consisting of memory bank creation, moving entities across memory banks, adding entities to a memory bank, propagating changes across entities, and combinations thereof.

13. A non-transitory computer readable storage medium comprising a computer readable pro-gram for performing question answer (QA) tasks, wherein the computer readable program when executed on a computer causes the computer to perform the steps of:
organizing entities into progressively weighted banks within an arrangement of memory banks with a bank controller of an adaptive memory network, wherein a final memory bank having a highest relevance for highest relevance entities is positioned closest by logical relationship to a decoder; and
inferring an answer for the question answer (QA) task with the decoder analyzing only the highest relevance entities in the final memory bank, wherein by limiting the decoder analysis to only the highest relevance entities decreases inference time.

14. The non-transitory computer readable storage medium as recited in claim 13, wherein an encoder creates the entities from words processed from a story, and sentences processed from the story.

15. The non-transitory computer readable storage medium as recited in claim 13, wherein the entities are directed to scheduling data, the highest relevance entities directed to scheduling data being in the final memory bank, the decoder providing a schedule based upon the highest relevance entities directed to scheduling data.

16. The non-transitory computer readable storage medium as recited in claim 13, wherein said gradually increasing relevance banks extend from the initial memory bank to the final memory bank, the gradually increasing relevance banks having gradually increasing relevant entities.

17. The non-transitory computer readable storage medium as recited in claim 13, wherein the memory bank controller organizes the entities using at least one memory bank function selected from the group consisting of memory bank creation, moving entities across memory banks, adding entities to a memory bank, propagating changes across entities, and combinations thereof.

18. The non-transitory computer readable storage medium as recited in claim 17, wherein the memory bank controller organizes the entities with said memory bank creation, wherein new memory banks for the entities is formed by the bank controller when the entities entropy exceeds a maximum preset entropy.

19. The non-transitory computer readable storage medium as recited in claim 17, wherein by creating said new memory banks, the adaptive memory network spreads out a concentration of information, which in turn increases the discretizes nodes according to relevance.

* * * * *